United States Patent Office 3,041,322
Patented June 26, 1962

3,041,322
ANAEROBIC CURING COMPOSITIONS CONTAINING ACRYLIC ACID DIESTERS
Vernon K. Krieble, 102 N. Beacon St., Hartford, Conn.
No Drawing. Filed July 20, 1959, Ser. No. 828,012
11 Claims. (Cl. 260—89.5)

The present invention relates to a composition having novel anaerobic curing characteristics and utilizing polymerizable compounds having the following general formula:

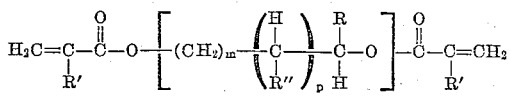

where R is a member selected from the class consisting of hydrogen, —CH$_3$, —C$_2$H$_5$, —CH$_2$OH, and

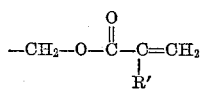

radicals, R' is a member selected from the class consisting of hydrogen, chlorine and the methyl and ethyl radicals, R'' is a member selected from the class consisting of hydrogen, —OH radical, and

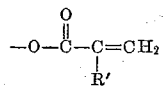

radical; $m$ is an integer equal to at least 1, e.g. from 1 to 8 or higher, for instance, from 1 to 4, inclusive; $n$ is an integer equal to at least 1, for example, from 2 to 20 or more, and $p$ is one of the following: 0, 1.

Anaerobic curing characteristics may be defined as the property of a polymerizable compound to polymerize rapidly and spontaneously to the solid state upon the exclusion of air or oxygen from the compound. A principal novel feature of the compositions of the present invention is that, in addition to having anaerobic curing characteristics, the compositions have a long shelf life in the liquid state as long as contact with air is maintained. This property is particularly useful in the bonding or adhering of adjacent surfaces since the composition can be stored or permitted to stand in contact with air for extended periods of time without polymerizing, yet when it is deposited or placed between adjacent surfaces, the accompanying exclusion of air causes the composition to polymerize and form a strong bond. The foregoing compounds, as such, do not have anaerobic properties, which is to say that they will remain liquid over long periods of time when excluded from contact with air.

In U.S. Patent No. 2,628,178 to Burnett et al., there is disclosed an anaerobic curing composition provided by oxygenating the monomer of the present invention, and which remains in the liquid, unpolymerized state only so long as oxygen or air is bubbled through the composition.

In my copending application, Serial No. 699,209, filed November 27, 1957, now United States Patent No. 2,895,950, I have described and claimed an air-stable, anaerobically curing composition comprised of the substantially unoxygenated monomer and a non-polymerizing organic hydroperoxide catalyst having a formula in which the atoms directly linked to the carbon atom bearing the hydroperoxide radical are selected from the group consisting of carbon, hydrogen, nitrogen or oxygen and in such cases where all of said directly linked atoms are carbon, not more than two of said carbon atoms comprise the carbon atom of a methyl group. These compositions will remain liquid and unpolymerized so long as they are maintained in contact with air, but will rapidly polymerize and cure to a strong bond when placed between two surfaces to be bonded in the exclusion of air.

In the Burnett patent, a mixture of tertiary butyl hydroperoxide and unoxygenated tetraethylene glycol dimethacrylate failed to gel even after 72 hours. Tests indicated that tertiary butyl hydroperoxide alone was not only a very poor catalyst, but also that it is not air-sensitive, i.e., it apparently catalyzes the slow polymerization of the monomer in the presence or absence of air.

I have now found that air-stable, anaerobic curing composition is provided by a mixture consisting essentially of a substantially unoxygenated monomer corresponding to the following general formula:

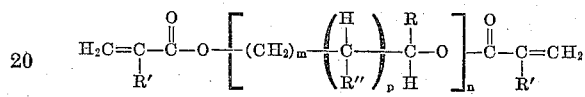

where R, R', R'', $m$, $n$ and $p$ have the meanings hereinbefore stated, and minor amounts, less than 15 percent, of tertiary butyl hydroperoxide and a triorganoamine sufficient to cause the monomer to polymerize in the absence of oxygen and characterized by the inability to polymerize the monomer in the presence of oxygen.

The term "unoxygenated," as used herein, refers to unmodified monomers corresponding to the above formula as distinguished from the "oxygenated" monomers of U.S. Patent No. 2,628,178 which are prepared by passing oxygen through the monomer for an extended period of time.

The term "triorganoamine," as used herein, refers to organic amines wherein all three valences of the nitrogen atom are satisfied by carbon atoms. The carbon atoms may be part of alkyl, carbocyclic or heterocyclic groups, either unsubstituted or hydroxyl-substituted. Generally, the trialkylamines and dialkylanilines are most conveniently employed. However, alkaloids and other compounds within the scope of the above definition are also suitable for the present invention, the requirement being that there be no free hydrogen on the nitrogen atom. The triorganoamine is preferably liquid at room temperature for ease in handling and mixing, although gaseous and solid compounds may be employed by dispersing them in the monomer. Exemplary of the various triorganoamines which may be utilized are triethylamine, tripropylamine, tributylamine, triamylamine, triphenylamine, dimethylaniline, ethyldiethanolamine, triethanolamine and piperidine.

The amounts of tertiary butyl hydroperoxide and triorganoamine added to the monomer should be sufficient to polymerize the monomer within about five hours, when confined between close-fitting metal parts but should also provide a shelf life for the mixture of at least one month, i.e. no gelation should be observable, and preferably even greater lengths of time. Generally, only minor amounts, less than 15 percent by weight, of tertiary butyl hydroperoxide and triorganoamine are necessary. Although I have found that as little as 0.1 percent by weight of the tertiary butyl hydroperoxide and 0.1 percent by weight of the triorganoamine will provide anaerobic curing properties, I generally employ about 1–15 percent of the hydroperoxide and 1–10 percent of the triorganoamine conveniently utilized for quick curing compositions, and preferably about 2–10 percent of the hydroperoxide and 2–8 percent of the triorganoamine for optimum curing and storage properties.

The function of the triorganoamine in the present composition is not fully understood. The mixture of monomer, tertiary butyl hydroperoxide and triorganoamine has been found to be air-stable and air-sensitive, i.e., under proper storage conditions the sealant mixture will not gel for prolonged periods of time in the presence of oxygen, but will rapidly set and cure in the absence of oxygen, in contrast with a mixture of only the monomer and tertiary butyl hydroperoxide.

The ingredients may be mixed at ordinary room temperature and at a time which is well in advance of the actual use of the composition. So long as some air is present, which may be nothing more than a small layer of air in a properly shaped sealed container as of glass, or preferably a polyethylene or other container which permits the passage of air therethrough, the material will not polymerize upon storage for prolonged periods of time even as long as one year or more. However, when the mixture is entirely excluded from contact with air, such as when the same is applied between adjacent metal surfaces such as between the threads of a threaded connection or between plates, etc., the material will rapidly polymerize and form a strong bond. The time required to form such a bond upon the exclusion of air may be varied over a wide range by the proper selection of the particular materials added and the amount thereof, and by varying the temperature during polymerization. If desired, the setting time when air is excluded may be reduced to as little as three minutes or less, or may be extended to the range of an hour or so where rapid setting is not essential or desirable.

The starting materials which may be utilized in accordance with the invention are those corresponding to the above general formula and include, for example, diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di-(chloroacrylate), diglycerol diacrylate, and di-gylcerol tetramethacrylate. The foregoing compositions need not be in the pure state but may comprise commercial grades of such polymerizable materials in which inhibitors or stabilizers such as hydroquinone may be present. It is within the scope of the invention in order to obtain modified characteristics to utilize one or more of the said starting materials with other unsaturated monomers such as unsaturated hydrocarbons or unsaturated esters.

The sealant mixtures of the present invention are nonvolatile and may be made up in varying viscosities depending upon the monomer and triorganoamine selected and whether or not thickening agents are added. For use in bonding closely fitting surfaces or for application to previously assembled parts where it is desired to have the sealant penetrate between mating surfaces, a thin liquid of low viscosity having good capillary action characteristics is preferred. For sealing or bonding loose fitting surfaces where there are relatively large spaces or voids to be filled, it generally is preferred to select a sealant mixture which is relatively viscous.

As previously mentioned, the sealant mixtures of the present invention may be applied in relatively small amounts, usually only a drop or two, to the surfaces to be joined either prior or subsequent to joining. In general it is preferred to degrease the surfaces to be joined prior to application of the sealant. In the absence of air, the sealant sets up without appreciable shrinkage to a strong solid resin which is resistant to chemical attack, heat aging and solvent action. Among the surfaces which appear to be most effectively bonded by the sealant of the present invention are glass, ceramic and metal surfaces and combinations thereof. The shear strength of the bond between metal surfaces is frequently as great or greater than that of the metal itself and when treating softer metals, such as aluminum fasteners, it may be desired to reduce the shear strength of the bond by the use of suitable addition agents.

When the parts to be treated with sealant are already assembled or joined, the liquid sealant applied thereto will penetrate between the adjoining surfaces by capillary action following which the sealant between the surfaces will rapidly polymerize to a solid resin bond because of the absence of air. Any excess sealant which is not between the surfaces and thus remains exposed to air will remain liquid and can easily be wiped off. When the liquid sealant is applied to the parts prior to assembly or joining, the liquid sealant coating remains exposed to air and thus will remain liquid until the parts are assembled and joined, whereupon the air between the mating surfaces is excluded and causes a solid bond to form between the surfaces. This characteristic is particularly advantageous in the case of fasteners used in large quantities, particularly threaded fasteners such as nuts and bolts, where it may be desirable to apply sealant to large batches or quantities of the parts in advance instead of treating each part individually just prior to assembly.

There is a marked catalytic or accelerating effect on the cure of the monomer-catalyst sealant mixtures of the present invention by most metals. Glass or plastic containers are preferred for storing the mixture. Also it is desirable to avoid storage of the mixture in direct sunlight since this also will accelerate curing and reduce shelf life. The effect of sunlight can be minimized by the use of colored translucent or opaque containers.

While most metals have a catalytic or accelerating effect on the cure of the sealant, certain metals, notably cadmium and zinc, do not have such an effect and thus when applying the sealants to surfaces of cadmium and zinc it is preferred to pretreat these surfaces with a heavy metal compound which is soluble in the monomer-catalyst mixture such as ferric chloride, and cobalt, manganese, lead, copper and iron "soaps" such as cobalt-2-ethyl hexoate, cobalt-2-ethyl butyrate, cobalt naphthenate, cobalt laurate, manganese-2-ethyl hexoate, manganese-2-ethyl butyrate, manganese naphthenate, manganese laurate, lead-2-ethyl hexoate, lead-2-ethyl butyrate, lead naphthenate, lead laurate, etc., and mixtures thereof. These heavy metal compounds may be readily applied to the surfaces, for example, by wetting the surfaces with a dilute solution of the heavy metal compound in a volatile solvent such as trichlorethylene and then permitting the solvent to evaporate. Cadmium and zinc surfaces so treated can be bonded together with the sealants of the present invention as quickly as any other metals.

As a measure of the activity of the composition, several simple tests are available. In one test, several drops of the admixture may be placed between two plates of glass or metal, or of glass and metal, preferably at right angles to each other. When it is possible to move the two plates as a unit by manipulating one of the plates, it is evident that polymerization has taken place. In general, such a degree of polymerization within several hours is satisfactory for most purposes, although longer periods are permissible for some applications where bond strength is not required immediately. A more quantitative test is provided by subjecting the plates to shear stress to determine the shear strength of the bond.

In another test, the strength of the bond between threaded members is determined by placing several drops of the sealant in the threads between a nut and bolt, tightening the nut to a predetermined torque, and allowing the sealant to set and cure. In some instances, the break-loose torque is noted, but, more conventionally, the prevailing torque is the measure of bond strength. To obtain the prevailing torque for the bond, the torque required to turn the bolt or screw at several, usually five, points after the break-loose torque and up to one full turn are averaged. For example, the torques required at $1/10$, $2/10$, $3/10$, $1/2$ and 1 turn are taken and averaged. Commercially, a bolt adhesive developing a prevailing torque of one foot pound on a ⅜ inch full nut is considered satisfactory.

Illustrative of the efficacy of compositions made in accordance with the present invention are the following examples:

Example 1

Tetraethylene glycol dimethacrylate was admixed with 7 percent by weight of tertiary butyl hydroperoxide and 2 percent triethylamine. The composition was stored in a polyethylene bottle containing air, and no gelation was noted even after storage for one month.

A few drops of the composition were placed upon the threads of ⅜ inch diameter cap screws and nuts. The assembled bolts and nuts were tested after eighteen hours at room temperature. The prevailing torque developed by the composition was 4.7 foot pounds.

Example 2

Tetraethylene glycol dimethacrylate was admixed with 10 percent by weight of tertiary butyl hydroperoxide and 4 percent of dimethylaniline. The mixture was stored in polyethylene bottles in the presence of air, and no gelation was noted even after one month.

A few drops were placed on the threads of a ⅜ inch cap screw and bolt. After eight hours at room temperature, the prevailing torque was 3.2 foot pounds.

Example 3

Tetraethylene glycol dimethacrylate was admixed with 10 percent by weight of tertiary butyl hydroperoxide and 2 percent of ethyldiethanolamine. No gelation was observed even after a month's storage in a polyethylene bottle containing air.

The mixture was subjected to the test described in Example Two, and the prevailing torque was 5.7 foot pounds.

Example 4

Tetraethylene glycol dimethacrylate was admixed with 1 percent by weight of tertiary butyl hydroperoxide and 2 percent triethylamine. A few drops of the mixture were placed between crossed steel strips and cured at 100° F. for two hours. The adhesive bond was found to have a shear strength of about 900 p.s.i.

It will be apparent and understood that various modifications and equivalents coming within the realm of my discoveries may be used and I intend to include these within the scope of the appended claims defining my invention.

I claim:

1. A sealant composition having an extended shelf life when exposed to oxygen but capable of setting up in a relatively brief time when excluded from contact with oxygen comprising a mixture containing essentially an unoxygenated monomer corresponding to the general formula:

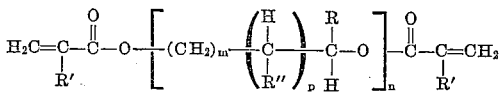

where R is a member selected from the class consisting of hydrogen, —CH₃, —C₂H₅, —CH₂OH,

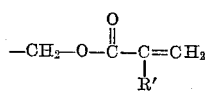

R' is a member selected from the class consisting of hydrogen, chlorine, —CH₃, and —C₂H₅, R'' is a member selected from the class consisting of hydrogen, —OH, and

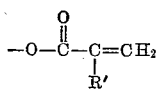

$m$ is an integer equal to at least 1, $n$ is an integer equal to at least 1, and $p$ is one of the following: 0, 1; and minor amounts, less than 15 percent, of tertiary butyl hydroperoxide and an organic amine having all three valences of the nitrogen atom satisfied by carbon atoms, sufficient to cause the monomer to polymerize in the absence of oxygen and characterized by their inability to polymerize the monomer in the presence of oxygen for prolonged periods of time at room temperature.

2. A sealant composition having an extended shelf life when exposed to oxygen but capable of setting up in a relatively brief time when excluded from contact with oxygen comprising a mixture containing essentially an unoxygenated monomer corresponding to the general formula:

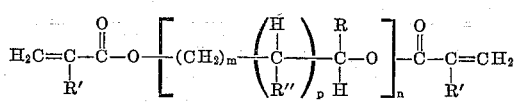

where R is a member selected from the class consisting of hydrogen, —CH₃, —C₂H₅, —CH₂OH,

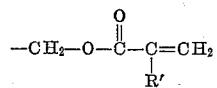

R' is a member selected from the class consisting of hydrogen, chlorine, —CH₃, and —C₂H₅, R'' is a member selected from the class consisting of hydrogen, —OH, and

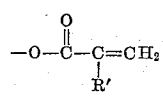

$m$ is an integer equal to at least 1, $n$ is an integer equal to at least 1, and $p$ is one of the following: 0, 1; 1.0 to 15 percent by weight of tertiary butyl hydroperoxide; and 1.0 to 10 percent of an organic amine having all three valences of the nitrogen atom satisfied by carbon atoms.

3. The composition in accordance with claim 2 wherein said organic amine is a trialkylamine.

4. The composition in accordance with claim 2 wherein said organic amine is a dialkylaniline.

5. The composition in accordance with claim 2 wherein said organic amine is a trialkylamine having at least one alkyl group hydroxyl-substituted.

6. A sealant composition having an extended shelf life when exposed to oxygen but capable of setting up in a relatively brief time when excluded from contact with oxygen comprising a mixture containing essentially an unoxygenated monomer corresponding to the general formula:

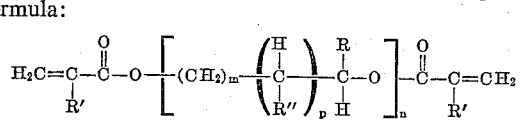

where R is a member selected from the class consisting of hydrogen, —CH₃, —C₂H₅, —CH₂OH.

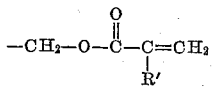

R' is a member selected from the class consisting of hydrogen, chlorine, —CH₃, and —C₂H₅, R'' is a member selected from the class consisting of hydrogen, —OH, and

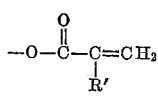

$m$ is an integer equal to at least 1, $n$ is an integer equal to at least 1, and $p$ is one of the following: 0, 1; 2 to 10 percent by weight tertiary butyl hydroperoxide and 2 to 8 percent of an organic amine having all three valences of the nitrogen atom satisfied by carbon atoms, said tertiary butyl hydroperoxide and triorganoamine being characterized by their ability to cause the monomer to polymerize when confined between metal surfaces in the absence of oxygen within a relatively short time and by their inability to polymerize the monomer in the presence of oxygen for prolonged periods of time at room temperature.

7. A sealant composition having an extended shelf life when exposed to oxygen but capable of setting up in a relatively short time when excluded from contact with oxygen in the presence of metal comprising, a mixture containing essentially an unoxygenated monomer corresponding to the general formula:

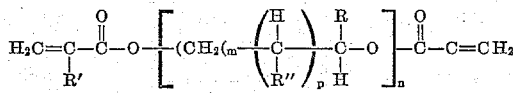

where R is a member selected from the class consisting of hydrogen, —CH$_3$, —C$_2$H$_5$, —CH$_2$OH,

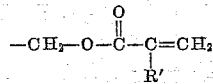

R' is a member selected from the class consisting of hydrogen, chlorine, —CH$_3$, and —C$_2$H$_5$, R" is a member selected from the class consisting of hydrogen, —OH, and

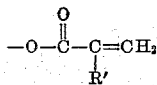

$m$ is an integer equal to at least 1, $n$ is an integer equal to at least 1, and $p$ is one of the following: 0, 1; 2 to 10 percent by weight of tertiary butyl hydroperoxide and 2 to 8 percent of an organic amine having all three valences of the nitrogen atom satisfied by carbon atoms, said tertiary butyl hydroperoxide and triorganoamine being characterized by their ability to cause the monomer to polymerize when confined between metal surfaces in the absence of oxygen within a relatively short time and by their inability to polymerize the monomer in the presence of oxygen for prolonged periods of time at room temperature.

8. The composition in accordance with claim 7 wherein said organic amine is a trialkylamine.

9. The composition in accordance with claim 7 wherein said organic amine is a dialkylaniline.

10. The composition in accordance with claim 7 wherein said organic amine is a trialkylamine having at least one alkyl group hydroxyl-substituted.

11. The composition in accordance with claim 7 wherein said organic amine is a heterocyclic nitrogen compound.

References Cited in the file of this patent
UNITED STATES PATENTS

| | | |
|---|---|---|
| 2,516,064 | Marks | July 18, 1950 |
| 2,610,965 | Vandenberg | Sept. 16, 1952 |
| 2,628,178 | Burnett et al. | Feb. 10, 1953 |
| 2,895,950 | Krieble | July 21, 1959 |
| 2,898,231 | Haas | Aug. 4, 1959 |